United States Patent
Maron

(10) Patent No.: US 7,774,749 B2
(45) Date of Patent: Aug. 10, 2010

(54) GUI-SUPPLYING MANAGEMENT BEANS

(75) Inventor: Jonathan Maron, Marlton, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1435 days.

(21) Appl. No.: 11/172,993

(22) Filed: Jul. 5, 2005

(65) Prior Publication Data

US 2007/0011618 A1    Jan. 11, 2007

(51) Int. Cl.
*G06F 9/45*    (2006.01)
(52) U.S. Cl. .................................................... 717/116
(58) Field of Classification Search ................... 717/116
See application file for complete search history.

(56) References Cited

U.S. PATENT DOCUMENTS

| | | | |
|---|---|---|---|
| 7,443,917 B2 * | 10/2008 | Vitenberg ................... 375/260 |
| 7,526,519 B2 * | 4/2009 | Potter et al. .................. 709/200 |
| 7,546,605 B1 * | 6/2009 | Kruger et al. ............... 719/316 |
| 2003/0069969 A1 * | 4/2003 | Renaud ...................... 709/225 |
| 2003/0177477 A1 * | 9/2003 | Fuchs .......................... 717/136 |
| 2004/0003122 A1 * | 1/2004 | Melillo ...................... 709/246 |
| 2005/0216488 A1 * | 9/2005 | Petrov et al. ................ 707/100 |

\* cited by examiner

*Primary Examiner*—John Chavis
(74) *Attorney, Agent, or Firm*—Hanify & King

(57) ABSTRACT

A technique is provided by which a JMX management console can be created that reduces the time and expense needed to create the console, and which reduces the likelihood of errors being introduced. A method for providing an interface comprises providing a software object including a representation of a graphical user interface, requesting from the software object the representation of the graphical user interface, and displaying the graphical user interface.

21 Claims, 4 Drawing Sheets

300

GUI-SUPPLYING MANAGEMENT BEANS

BACKGROUND OF THE INVENTION

1. Field of the Invention

The present invention relates to creating a graphical user interface using a software object that includes a representation of the graphical user interface, and which supplies the representation of the graphical user interface when it is desired to display the graphical user interface.

2. Description of the Related Art

Java Management Extensions Technology is a new feature in Java. JMX technology provides a simple, standard way of managing resources such as applications, devices, and services. Creating a Java Management Extensions (JMX) management console is currently a two phase process:

1) Create the MBean on the server side—Management facilities are provided on the server-side by creating Management Beans (MBeans) and registering them with an MBean Server instance.

2) Create a client-interface for the given MBean—In order to offer the facilities of the MBean on the console an interface needs to be defined (HTML, Java Swing, etc.) and integrated into the console.

This can be a time-consuming and expensive process involving additional steps in which errors can be introduced (thus prolonging the development process). In addition, extending the interface to include new management features is a process requiring integration and cooperation between the MBean developer and the console developer (generally these two are not related) to both link the GUI elements to the appropriate MBean methods and provide a usable visual interface.

A need arises for a technique by which a JMX management console can be created that reduces the time and expense needed to create the console, and which reduces the likelihood of errors being introduced.

SUMMARY OF THE INVENTION

The present invention provides a technique by which a JMX management console can be created that reduces the time and expense needed to create the console, and which reduces the likelihood of errors being introduced. A method for providing an interface comprises providing a software object including a representation of a graphical user interface, requesting from the software object the representation of the graphical user interface, and displaying the graphical user interface.

The software object may be a Java Managed Bean. The representation of the graphical user interface may be an XML document describing the GUI elements and the methods they invoke, an HTML document, or a serializable GUI interface. The representation of the graphical user interface may be requested by a Java management application. The Java management application may be a Java management extensions management console. The representation of the graphical user interface may be requested via a Java management extensions agent layer.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Java Management Extensions Technology is a new feature in Java. JMX technology provides a simple, standard way of managing resources such as applications, devices, and services. Because JMX technology is dynamic, it can be used to monitor and manage resources as they are created, installed, and implemented. The JMX specification defines an architecture, the design patterns, the APIs, and the services for application and network management and monitoring in the Java programming language.

Using JMX technology, a given resource is instrumented by one or more Java objects known as Managed Beans, or MBeans. These MBeans are registered in a core managed object server, known as an MBean server, which acts as a management agent and can run on most devices enabled for the Java programming language.

The specifications define JMX agents that are used to manage resources instrumented in compliance with the specifications. A JMX agent consists of an MBean server, in which MBeans are registered, and a set of services for handling MBeans. In this way, JMX agents directly control resources and make them available to remote management applications.

The way in which resources are instrumented is completely independent from the management infrastructure. Resources can therefore be rendered manageable regardless of how their management applications are implemented.

JMX technology defines standard connectors (JMX connectors) that allow access to JMX agents from remote management applications. JMX connectors using different protocols provide the same management interface. Hence a management application can manage resources transparently, regardless of the communication protocol used. JMX agents can also be used by systems or applications that are not compliant with the JMX specification but which support JMX agents.

A JMX management console is a type of management application that provides access to JMX agents. Such a management console provides developers and administrators with an intuitive user interface to access, manage, and monitor JMX based services, such as viewing the MBean metadata, getting and setting the MBean attributes, invoking MBean operations, unregistering MBeans, creating MBeans, and receiving MBean notifications.

Figure 1:
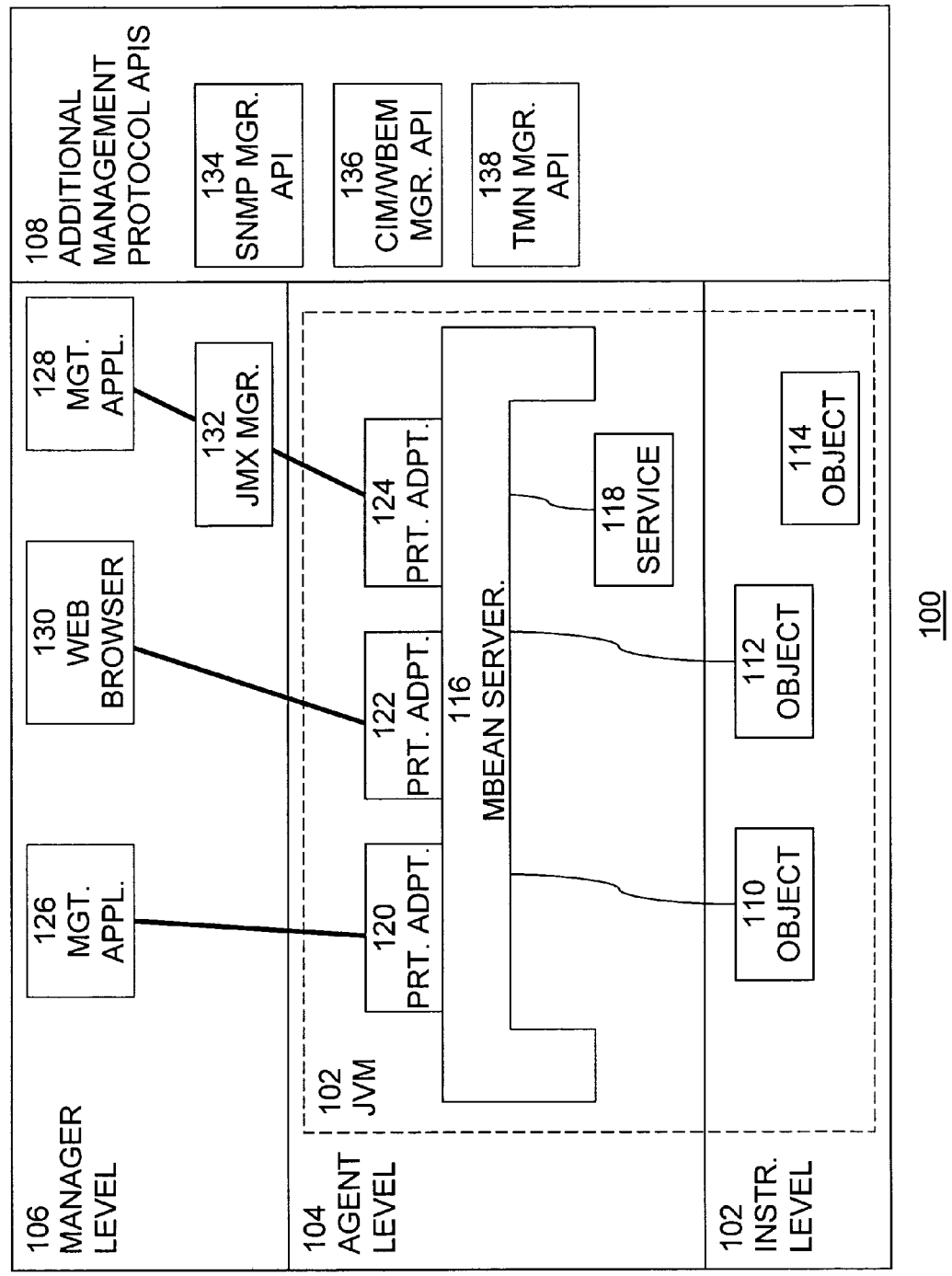
FIG. 1 is an exemplary software block diagram of a system architecture in which the present invention may be implemented.

An example of a JMX 100 architecture is shown in FIG. 1. JMX provides developers of Java technology-based applications with the means to instrument Java platform code, create smart agents and managers in the Java programming language, implement distributed management middle-ware, and smoothly integrate these solutions into existing management systems. The JMX architecture is divided into three levels:

Instrumentation level 102
Agent level 104
Manager level 106

In addition, JMX provides a number of Additional Management Protocol APIs 108 for existing standard management protocols. These APIs are independent of the three-level model, yet they are essential because they enable JMX applications in the Java programming language to link with existing management technologies.

The JMX architecture is built according to a three-level model. This gives flexibility by allowing subsets of the specification to be used individually by different developer communities utilizing Java technology.

Instrumentation level 102 provides manageability to any Java technology-based object, such as objects 110, 112, and 114. This level is aimed at the entire developer community utilizing Java technology. This level provides management of Java technology which is standard across all industries.

A JMX manageable resource is a resource that has been instrumented in accordance with the JMX Instrumentation Level Specification and tested against the Instrumentation Level Compatibility Test Suite.

A resource can be a business application, a device, or the software implementation of a service or policy. In order to be instrumented, a resource can be fully written in the Java programming language or just offer a Java technology-based wrapper. Anything that needs to be managed, now or in the future can be instrumented and considered as a potential resource.

Agent level 104 provides management agents, which are containers that provide core management services which can be dynamically extended by adding JMX resources. This level is aimed at the management solutions development community and provides management through Java technology.

A JMX agent is a management entity implemented in accordance with the JMX Agent Specification and tested against the Agent Level Compatibility Test Suite. A JMX Agent is composed of an MBean server 116, a set of MBean objects, such as objects 110 and 112, representing managed resources, and at least one protocol adaptor or connector, such as protocol adaptors 120, 122, and 124. A JMX Agent may also contain management services, also represented as MBeans, such as service 118. In the JMX architecture, services are also MBeans that can be added and removed as needs evolve. This gives scalability to agents and managers, which is critical when these are deployed on thin clients.

The JMX specification currently defines the interface for such basic services as a registry for MBeans, queries of this registry, operations on resources and the forwarding of events back to managers, dynamic loading of new MBeans, creation of relationships and dependencies between MBeans, timer functions and attribute monitoring. Other management services that will be integrated into the specification include bootstrapping and persistence, network policy management, discovery of agents and managers, and security.

A managed bean, or MBean for short, is a Java object that represents a JMX manageable resource. By design, MBeans also follow the JavaBeans components model, thus providing a direct mapping between JavaBeans components and manageability. Because MBeans provide instrumentation of managed resources in a standardized way, they can be plugged into any JMX agent.

The MBean server 116 is a registry for MBeans in the agent. The MBean server is the component which provides the services allowing the manipulation of MBeans. All management operations performed on the MBeans are done through Java technology-based interfaces on the MBean server.

Protocol adaptors and connectors, such as protocol adaptors 120, 122, and 124, let management applications, such as management applications 126 and 128, and web browser 130, access a JMX agent and manipulate the MBeans it contains. Protocol adaptors give a representation of the MBeans directly in another protocol, such as HTML or SNMP. Connectors include a remote component that provides end-to-end communications with the agent over a variety of protocols (for example HTTP, HTTPS, IIOP). Since all connectors have the same Java technology-based interface, management applications use the connector most suited to their networking environment and even change connectors transparently as needs evolve.

A JMX manager 132 is a management entity implemented in accordance with the JMX Manager Specification and tested against the Manager Level Compatibility Test Suite. A JMX manager provides an interface for management applications, such as management application 128, to interact with the agent, distribute or consolidate management information, and provide security. JMX managers can control any number of agents, thereby simplifying highly distributed and complex management structures.

Both JMX agents and JMX managers integrate services that give them autonomy and intelligence. These services enable agents to handle their resources and let mangers forward information back and forth between agents and management applications. Agents are more autonomous because they can incorporate certain management tasks, such as polling. The intelligence is embodied in simple logic that can keep managers from escalating unimportant alarms. Both of these measures can reduce network traffic and make management applications more resistant to outages.

Manager level 106 provides management components that can operate as a manager or agent for distribution and consolidation of management services. This level is aimed at the management solutions development community and completes the management through Java technology provided by the Agent level. Manager level 106 includes management applications, such as management applications 126 and 128, JMX manager 132, and web browser 130. A JMX management console is a type of management application that provides access to JMX agents.

In order to build upon existing management technologies, the JMX specification also provides interfaces to the most widespread protocols in use today:

Additional management protocol APIs 108 provide a means of interacting with other management environments. The Additional management protocol APIs are aimed at the management systems development community and provide integration with existing management solutions.

The goal of the Additional Management Protocol APIs is to provide a standard way for Java management applications to interact with existing management technologies, such as Simple Network Management Protocol (SNMP) API 134, Common Information Model (CIM)/Web Based Enterprise Management (WBEM) API 136, and Telecommunications Management Network (TMN) API 138. Typically, an application will use one of these APIs to access a legacy system and expose its attributes as a JMX manageable resource. This resource will then allow any JMX-compliant management application to manage the legacy system through a JMX agent. These APIs therefore create a bridge between existing and future technologies.

Figure 2:
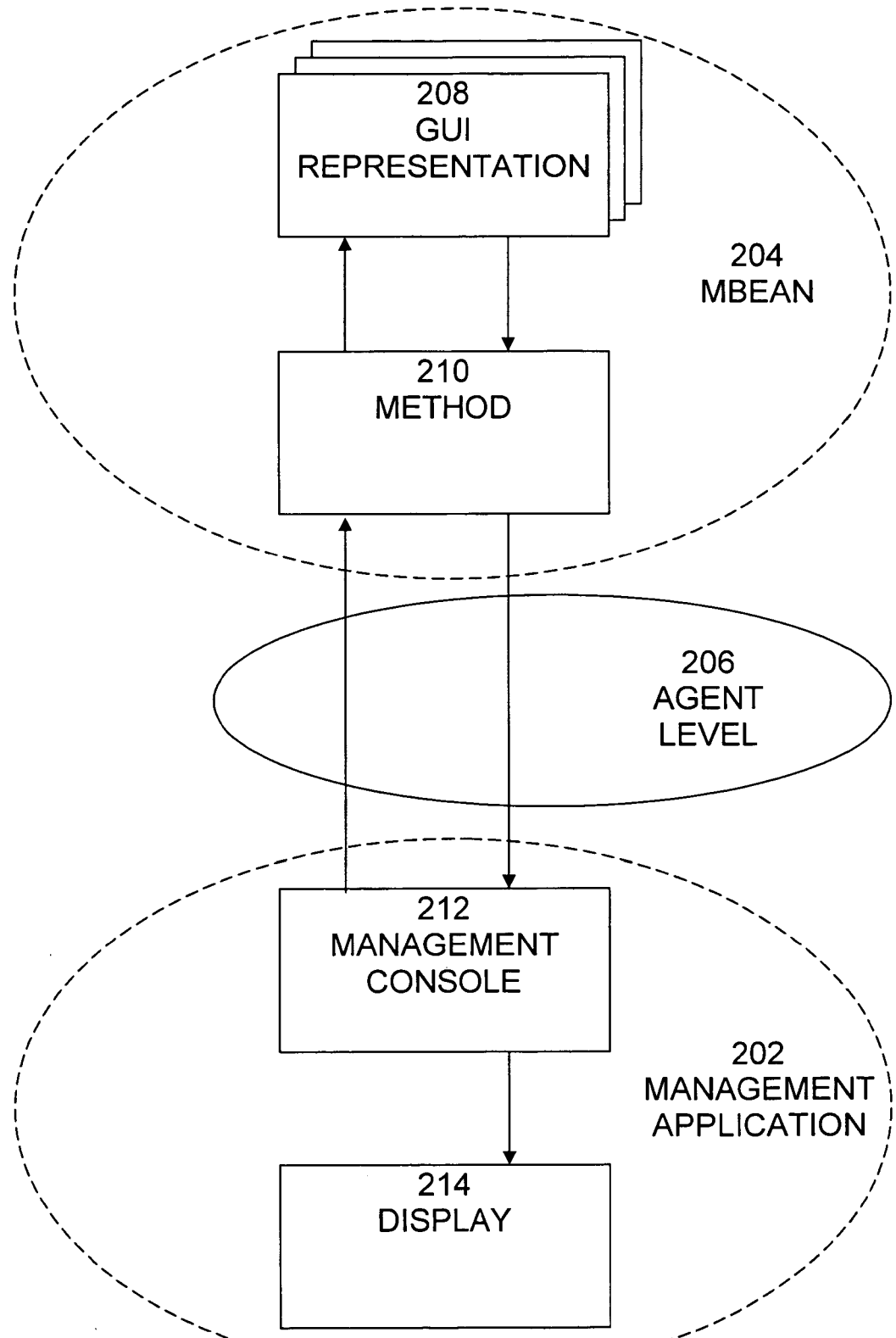
FIG. 2 is exemplary block diagram of an MBean that supplies a graphical user interface to a management console.

An example of an MBean that supplies a graphical user interface to a management console is shown in FIG. 2. It is best viewed in conjunction with FIG. 3, which is a process 300 of supplying a graphical user interface (GUI) to a management console from an MBean. As shown in FIG. 2, a management application 202 communicates with an MBean 204 through an agent level interface 206, such as that shown in FIG. 1. MBean 204 includes at least one representation of a GUI 208 and a method 210 by which a GUI representation 208 can be supplied. Management application 202 includes management console 212, which obtains GUI representation 208 from MBean 204 and generates a display 214 based on GUI representation 208.

Figure 3:
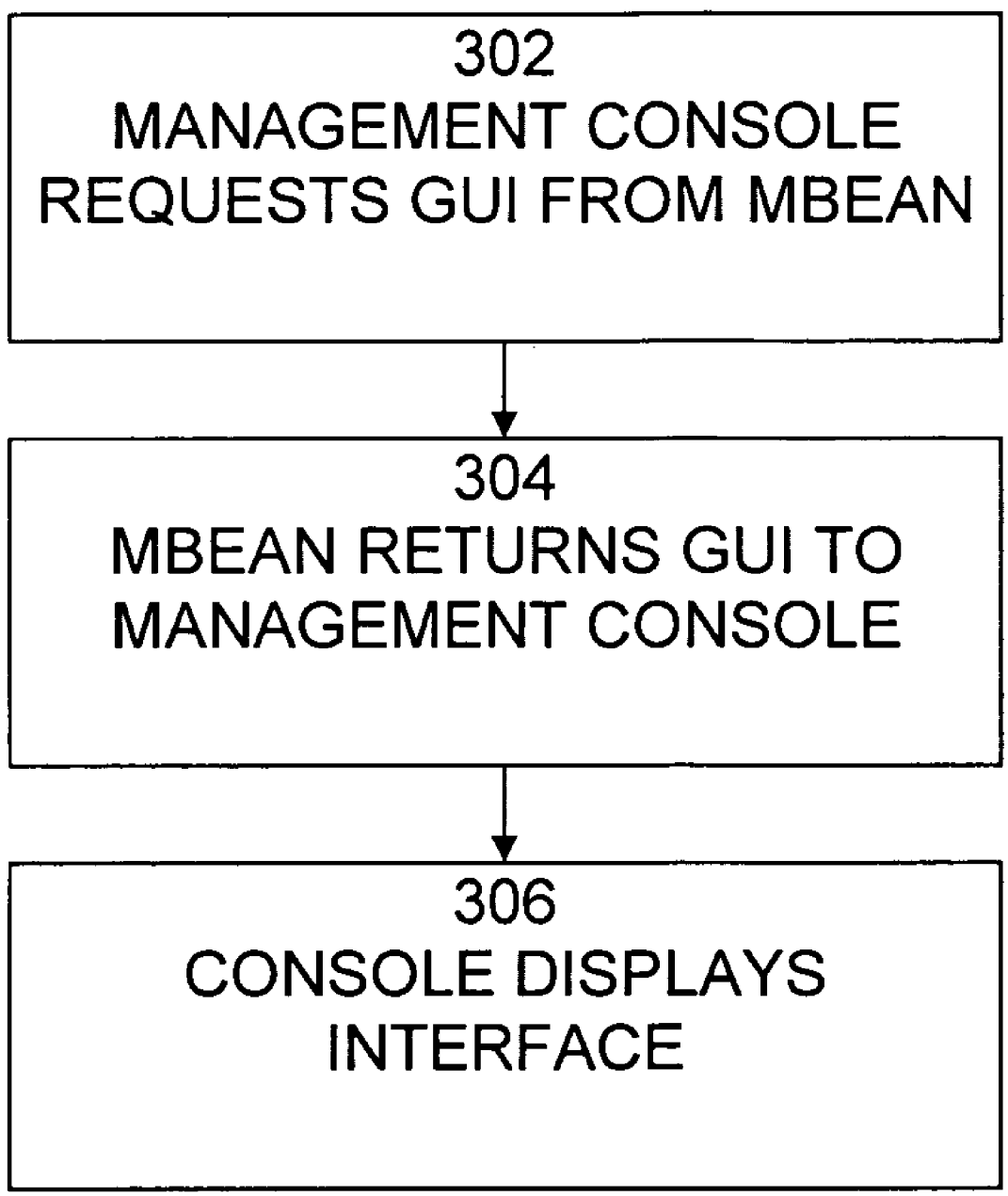
FIG. 3 is an exemplary flow diagram of a process of supplying a graphical user interface (GUI) to a management console from an MBean.

As shown in FIG. 3, when management console 212 is to display a GUI based on GUI representation 208, in step 302 of process 300, management console 212 invokes method 210 of MBean 204 in order to request GUI representation 208. This method invocation is communicated via agent level 206 to MBean 204. For example, console 212 may discern that MBean 204 can return a GUI representation based on a naming convention (something in the name of the MBean may indicate the availability of an interface) or like mechanism. While invoking the method, the console may indicate to the MBean the type of GUI representations it can render. In step 304, method 210 may then select an appropriate GUI representation 208 from among the GUI representation available and return the selected GUI representation 208 to management console 212, again via agent level 206. In step 306, management console 212 generates display 214 based on the received GUI representation 208 and presents display 214 to the user.

GUI representation 208 can take any number of forms, such as an XML document describing the GUI elements and the methods they invoke, an HTML document, a serializable GUI interface (e.g. Java Swing), etc.

Figure 4:
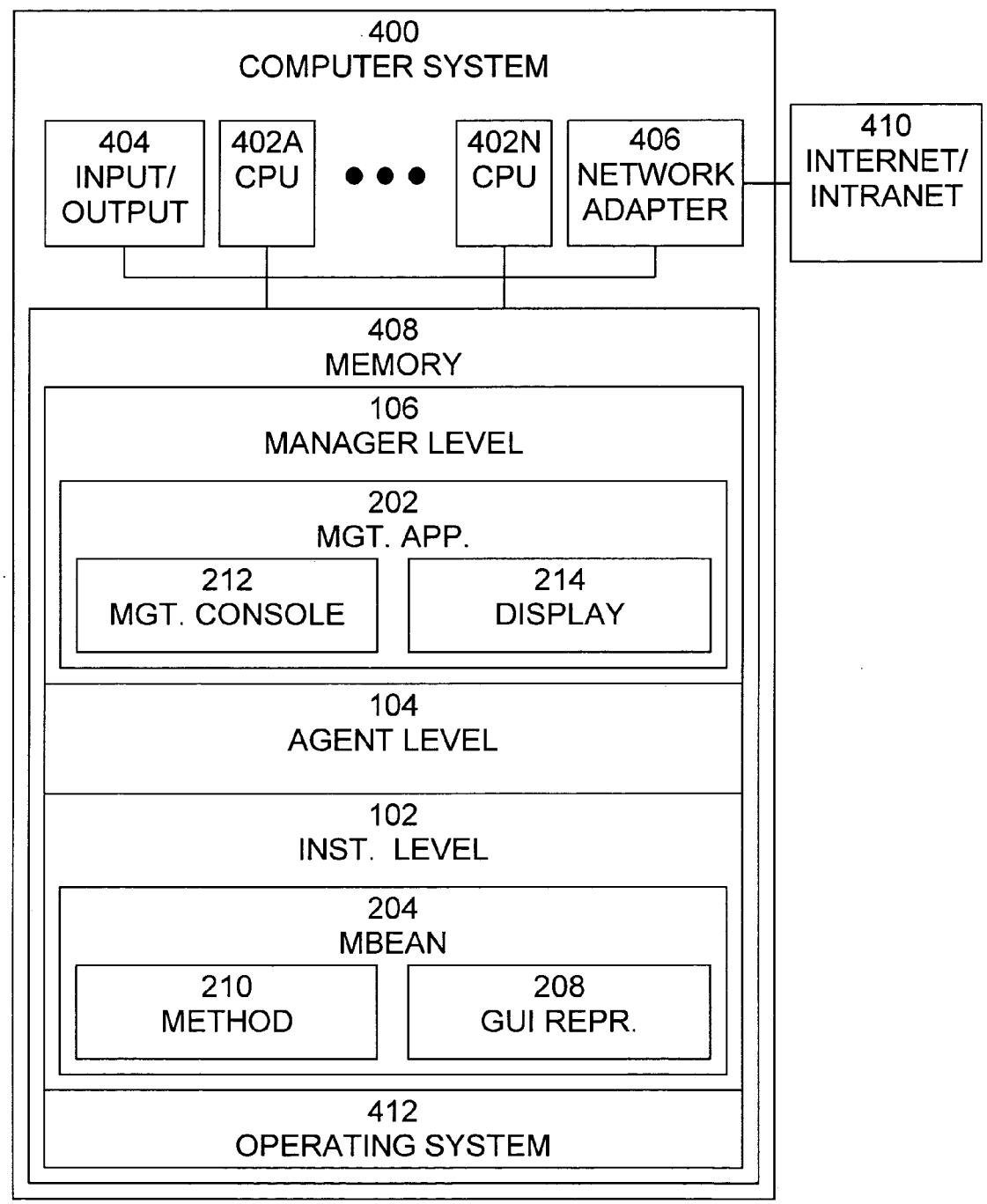
FIG. 4 is an exemplary block diagram of a computer system in which the present invention may be implemented.

An exemplary block diagram of a computer system 400 is shown in FIG. 4. System 400 is typically a programmed general-purpose computer system, such as a personal computer, workstation, server system, and minicomputer or mainframe computer. System 400 includes one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which System 400 is implemented as a single multi-processor computer system, in which multiple processors 402A-402N share system resources, such as memory 408, input/output circuitry 404, and network adapter 406. However, the present invention also contemplates embodiments in which System 400 is implemented as a plurality of networked computer systems, which may be single-processor computer systems, multi-processor computer systems, or a mix thereof.

Input/output circuitry 404 provides the capability to input data to, or output data from, database/System 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database/System 400 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of system 400. Memory 408 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 408 varies depending upon the function that system 400 is programmed to perform. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 4, memory 408 includes manager level 106, agent level 104, instrumentation level 102, and operating system 412. Manager level 106 provides management components that can operate as a manager or agent for distribution and consolidation of management services. Manager level 106 includes management applications, such as management application 202. Management application 202 includes management console 212, which obtains GUI representation 208 from MBean 204 and generates a display 214 based on GUI representation 208.

Agent level 104 provides management agents, which are containers that provide core management services which can be dynamically extended by adding JMX resources.

Instrumentation level 102 provides manageability to any Java technology-based object and includes MBeans, such as MBean 204. MBean 204 includes at least one representation of a GUI 208 and a method 210 by which a GUI representation 208 can be supplied.

Operating system 412 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for providing an interface comprising:
   providing in a computer system a software object including a representation of a graphical user interface;
   requesting from the software object the representation of the graphical user interface by invoking a method of the software object, the request including an indication of types of graphical user interface that can be rendered, wherein the invoked method of the software object selects and returns a representation of a graphical user interface; and
   displaying the graphical user interface using the computer system.

2. The method of claim 1, wherein the software object is a Java Managed Bean.

3. The method of claim 2, wherein the representation of the graphical user interface is an XML document describing the GUI elements and the methods they invoke, an HTML document, or a serializable GUI interface.

4. The method of claim 3, wherein the representation of the graphical user interface is requested by a Java management application.

5. The method of claim 4, wherein the Java management application is a Java management extensions management console.

6. The method of claim 5, wherein the representation of the graphical user interface is requested via a Java management extensions agent layer.

7. The method of claim 1, wherein the representation of the graphical user interface is requested by a Java management application.

8. The method of claim 7, wherein the Java management application is a Java management extensions management console.

9. The method of claim 8, wherein the representation of the graphical user interface is requested via a Java management extensions agent layer.

10. A system for providing an interface comprising:
    a processor operable to execute computer program instructions;
    a memory operable to store computer program instructions executable by the processor; and
    computer program instructions stored in the memory and executable to perform the steps of:
    providing a software object including a representation of a graphical user interface;
    requesting from the software object the representation of the graphical user interface by invoking a method of the software object, the request including an indication of types of graphical user interface that can be rendered, wherein the invoked method of the software object selects and returns a representation of a graphical user interface; and
    displaying the graphical user interface.

11. The system of claim 10, wherein the software object is a Java Managed Bean.

12. The system of claim 11, wherein the representation of the graphical user interface is an XML document describing the GUI elements and the methods they invoke, an HTML document, or a serializable GUI interface.

13. The system of claim 12, wherein the representation of the graphical user interface is requested by a Java management application.

14. The system of claim 13, wherein the Java management application is a Java management extensions management console.

15. The system of claim 14, wherein the representation of the graphical user interface is requested via a Java management extensions agent layer.

16. A computer program product for providing an interface comprising:
    a computer readable storage medium;
    computer program instructions, recorded on the computer readable storage medium, executable by a processor, for performing the steps of
    providing a software object including a representation of a graphical user interface;
    requesting from the software object the representation of the graphical user interface by invoking a method of the software object, the request including an indication of types of graphical user interface that can be rendered, wherein the invoked method of the software object selects and returns a representation of a graphical user interface; and
    displaying the graphical user interface.

17. The computer program product of claim 16, wherein the software object is a Java Managed Bean.

18. The computer program product of claim 17, wherein the representation of the graphical user interface is an XML document describing the GUI elements and the computer program products they invoke, an HTML document, or a serializable GUI interface.

19. The computer program product of claim 18, wherein the representation of the graphical user interface is requested by a Java management application.

20. The computer program product of claim 19, wherein the Java management application is a Java management extensions management console.

21. The computer program product of claim 20, wherein the representation of the graphical user interface is requested via a Java management extensions agent layer.

* * * * *